(12) United States Patent
Liu et al.

(10) Patent No.: US 11,435,584 B2
(45) Date of Patent: Sep. 6, 2022

(54) LARGE FIELD OF VIEW SEE THROUGH HEAD MOUNTED DISPLAY HAVING MAGNIFIED CURVED INTERMEDIATE IMAGE

(71) Applicant: Hong Kong Applied Science and Technology Research Institute Co., Ltd., Shatin (HK)

(72) Inventors: Dehua Liu, Shenzhen (CN); Chun Yip Wong, Tai Po (HK); Kin Lung Chan, Kowloon (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 821 days.

(21) Appl. No.: 16/352,127

(22) Filed: Mar. 13, 2019

(65) Prior Publication Data
US 2020/0292816 A1 Sep. 17, 2020

(51) Int. Cl.
*G02B 27/00* (2006.01)
*G02B 27/01* (2006.01)
*G02B 27/28* (2006.01)

(52) U.S. Cl.
CPC ..... *G02B 27/0172* (2013.01); *G02B 27/0093* (2013.01); *G02B 27/283* (2013.01); *G02B 2027/013* (2013.01); *G02B 2027/0123* (2013.01)

(58) Field of Classification Search
CPC .......... G02B 27/0093; G02B 2027/011; G02B 2027/0123; G02B 2027/013;
(Continued)

(56) References Cited

U.S. PATENT DOCUMENTS

| 3,432,219 A | 3/1969 | Shenker et al. |
| 7,675,684 B1 | 3/2010 | Weissman et al. |

(Continued)

FOREIGN PATENT DOCUMENTS

| CN | 104142575 A | 11/2014 |
| CN | 105785571 A | 7/2016 |

(Continued)

OTHER PUBLICATIONS

International Search Report and Written Opinion issued for PCT Application No. PCT/CN2019/078430, dated Dec. 11, 2019, 11 pages.

(Continued)

*Primary Examiner* — Ryan S Dunning
(74) *Attorney, Agent, or Firm* — Norton Rose Fulbright US LLP

(57) ABSTRACT

Systems and methods providing optical structures providing a large field of view (FOV) for personal portable displays are described. An optical structure of embodiments comprises a catadioptric optical configuration configured to produce a magnified curved intermediate image, wherein the magnified curved intermediate image is furthered magnified with proper reflection angle and transmitted to viewer's eye. The catadioptric optical configuration may comprise two curved mirrors and a polarization prism. Optical structures comprising such catadioptric optical configurations may utilize relatively small sized image sources to produce a large FOV. Such optical structures are well suited for use in large FOV optical see through (OST) head-mounted displays (HMDs).

31 Claims, 9 Drawing Sheets

(58) Field of Classification Search
CPC .... G02B 2027/0138; G02B 2027/0145; G02B 27/0172; G02B 27/1066; G02B 27/283
See application file for complete search history.

(56) References Cited

U.S. PATENT DOCUMENTS

| | | | |
|---|---|---|---|
| 8,089,568 | B1 | 1/2012 | Brown et al. |
| 8,482,859 | B2 | 7/2013 | Border et al. |
| 8,488,246 | B2 | 7/2013 | Border et al. |
| 9,250,444 | B2 | 2/2016 | Magyar! |
| 9,360,935 | B2 | 6/2016 | Chan et al. |
| 2002/0034016 | A1 | 3/2002 | Inoguchi et al. |
| 2016/0320919 | A1 | 11/2016 | Zhang |
| 2017/0299860 | A1* | 10/2017 | Wall .................... G02B 3/04 |
| 2018/0278924 | A1* | 9/2018 | Schowengerdt ... G02B 27/0179 |

FOREIGN PATENT DOCUMENTS

| | | |
|---|---|---|
| CN | 107966812 A | 4/2018 |
| CN | 108369744 A | 8/2018 |
| CN | 108391033 A | 8/2018 |
| CN | 108681068 A | 10/2018 |
| CN | 108873344 A | 11/2018 |
| CN | 108873345 A | 11/2018 |
| CN | 208188482 U | 12/2018 |
| CN | 208384244 U | 1/2019 |
| EP | 0579506 A1 | 1/1994 |
| KR | 100386725 B1 | 6/2003 |

OTHER PUBLICATIONS

China National Intellectual Property Administration, Second Office Action issued for Patent Application No. 201980000360.2, dated Jul. 8, 2021, 3 pages.

China National Intellectual Property Administration, First Office Action issued for Patent Application No. 201980000360.2, dated Jan. 11, 2021, 11 pages (with English translation).

* cited by examiner

LARGE FIELD OF VIEW SEE THROUGH HEAD MOUNTED DISPLAY HAVING MAGNIFIED CURVED INTERMEDIATE IMAGE

TECHNICAL FIELD

The present invention relates generally to optical structures and, more particularly, to optical structure designs providing large fields of view, such as for use in large field of view optical see through head mounted displays.

BACKGROUND OF THE INVENTION

Display technology and electronics have progressed to the point that display systems have been introduced in a variety of form factors which have traditionally been impossible or impractical. For example, various forms of head-mounted displays have been developed to provide display of images and information to a viewer in real-time environments. Head-mounted display devices may, for example, be found in today's military, commercial, and consumer markets.

A head-mounted display is a display device that is worn on a viewer's head that has either one or two small displays (e.g., liquid crystal display (LCD) or light emitting diode (LED) display panel) located in front of each of the viewer's eyes. An optical head-mounted display device has the capability of reflecting the display images, allowing the viewer to see through those images.

In today's market, head-mounted display devices mainly fall into three different configuration categories: refractive/reflective, diffractive, and laser writer. Each of these head-mounted display configurations has drawbacks associated therewith. For example, conventional refractive/reflective head-mounted display devices are relatively bulky, thus presenting an often undesirable or even unacceptable form factor for many applications due to the resulting size and styling constraints. Moreover, conventional refractive/reflective optics produce a resulting eye box of limited size and the combiner optic is typically relatively thick. Conventional diffractive head-mounted display devices provide relatively limited field of view (FOV) capabilities. For a large FOV (i.e., >50°) head-mounted display implementation, the optical system is bulky such as due to the need for a large image source size (e.g., 3.5 inch~0.7 inch) and/or the bulky optical structure required. For example, the thrice reflected optical structure of U.S. Pat. No. 9,250,444, the disclosure of which is incorporated herein by reference, provides a FOV greater than 50° using an image source size of 0.39 inch at the cost of a large, multiple mirror reflective optical structure which is both bulky and has high manufacturing costs associated therewith. The once polarization converting and once reflected optical structure of U.S. Pat. No. 8,482,859, the disclosure of which is incorporated herein by reference, provides a small FOV (FOV<50° using a relatively large image source size (0.7 inch), and does not accommodate see-through transmission (see-through transmission <50%). The twice polarization converting and twice reflected optical structure of U.S. Pat. No. 7,675,684, the disclosure of which is incorporated herein by reference, provides a very small FOV (FOV<40° using a relatively large image source size (0.7 inch), and does not accommodate see-through transmission (see-through transmission <50%). The coherent fiber optic cable used in conventional laser writer HMD configurations is very expensive. From the foregoing it can be seen that head-mounted display configurations that provide for inexpensive, lightweight, and compact head-mounted display devices having a broad FOV in combination with other desirable attributes are problematic for conventional implementations.

BRIEF SUMMARY OF THE INVENTION

The present invention is directed to systems and methods providing optical structures providing a large field of view (FOV) for personal portable displays, such as head-mounted displays or helmet-mounted displays (collectively HMDs). Embodiments of an optical structure comprise a catadioptric (hybrid refractive/reflective) optical configuration. The catadioptric optical configuration of a large FOV optical structure of embodiments of the invention is configured to produce a magnified curved intermediate image, wherein the magnified curved intermediate image is furthered magnified with proper reflection angle and transmitted to viewer's eye. Accordingly, optical structures comprising such catadioptric optical configurations may utilize relatively small sized image sources (e.g., micro-display ≤0.40 inch diagonal) to produce a large FOV (i.e., >50°). Embodiments of a personal portable display implemented using an optical structure in accordance with concepts herein provides a very large FOV (e.g., 60°~90°), low ratio of focal length to diameter of the entrance pupil (e.g., F-number ~1.0), achieved as system aberration is well compensated through use of a magnified curved intermediate image, using small image source sizes (e.g., 0.39 inch for FOV60, 0.7 inch for FOV90). Accordingly, issues with respect to bulkiness of a personal portable display system are ameliorated using catadioptric optical configurations in cooperation with relatively small sized image sources to provide a large FOV image to a viewer.

Optical structures comprising a catadioptric optical configuration in accordance with embodiments of the invention facilitate HMD device implementations that are inexpensive, lightweight, and compact, yet provide a large FOV. Such optical structures are particularly well suited for use in large FOV optical see through (OST) HMDs. Large FOV OST-HMDs implementing optical structures in accordance with concepts of the present invention may, for example, be utilized in heads-up-display, virtual reality (VR), augmented reality (AR), Internet of thins (IoT) applications, etc. Large FOV OST-HMDs comprising optical structures of embodiments of the invention may be utilized in implementing virtual imaging head mounted displays used for wearable personal display applications such as AR/VR. For example, a compact large FOV OST-HMD implemented using an optical structure in accordance with concepts of the present invention may be utilized by AR/VR wearable product manufacturers to create next generation low cost AR/VR smart glasses with large a FOV see-through display and having a small form factor. Large FOV OST-HMD implementations using optical structures comprising a catadioptric optical configuration of embodiments may, for example, lower the wearable smart AR/VR glasses products entry barrier, allowing more companies to enter the AR/VR wearable market.

A catadioptric optical configuration of embodiments of the invention comprises two curved mirrors utilized in producing a magnified curved intermediate image and further magnifying the magnified curved intermediate image with proper reflection angle, wherein the magnified curved intermediate image produced using the first curved mirror provides a curved relay image plane for further magnified imaging by the second curved mirror with optical aberration corrected. The first and second curved mirrors of the two curved mirrors may, for example, comprise at least partially reflective curved mirrors of different sizes (e.g., the first curved mirror size<the second curved mirror size). The catadioptric optical configuration of embodiments may comprise a polarization convert prism assembly including a polarization prism and the first curved mirror of the two curved mirrors, wherein the polarization convert prism assembly is disposed to produce a magnified curved intermediate image for further magnifying by the second curved mirror of the two curved mirrors. The polarization convert prism assembly of embodiments may, in addition to the aforementioned polarization prism and first curved mirror, comprise a quarter wave plate and/or relay lens configured to cooperate with the polarization prism and first curved mirror to produce the magnified curved intermediate image. The catadioptric optical configuration of embodiments may further comprise a partially reflective curved combiner assembly, such as may include the second curved mirror of the two curved mirrors disposed in association with a partially reflective plate which cooperate to provide further magnification of the magnified curved intermediate image. The catadioptric optical configuration of embodiments may further include a lens assembly (e.g., including a lens group) disposed between the polarization convert prism and an image source (e.g., a light emitting diode (LED) display, an organic light emitting diode (OLED) display, liquid crystal display (LCD), liquid crystal on silicon (LCoS) display, etc.) for manipulating light from the display prior to the light entering the polarization convert prism assembly (e.g., to provide light collimation, image magnification, etc.).

Optical structures comprising a catadioptric optical configuration in accordance with embodiments of the invention facilitate implementations in which imaging and illumination share a same optical axis. For example, a light source (e.g., LED array, electro luminescent panel, etc.) may be disposed on the optical axis shared by the image display to provide illumination thereto. Such implementations are particularly well suited to provide illumination of otherwise unilluminated displays (e.g., LCoS displays) or otherwise under illuminated displays, while facilitating a compact form factor.

Optical structures comprising a catadioptric optical configuration in accordance with embodiments of the invention facilitate implementations in which virtual display and eye sensing share a same optical axis. For example, an imaging sensor (e.g., infrared (IR) sensor) may be disposed on the optical axis shared by the virtual image for eye tracking (e.g., eye movement detection, point of focus tracking, iris capturing, etc.). Such implementations are particularly well suited to enable advanced features associated with eye tracking, while facilitating a compact form factor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying drawings, in which.

DETAILED DESCRIPTION OF THE INVENTION

Figure 1A:
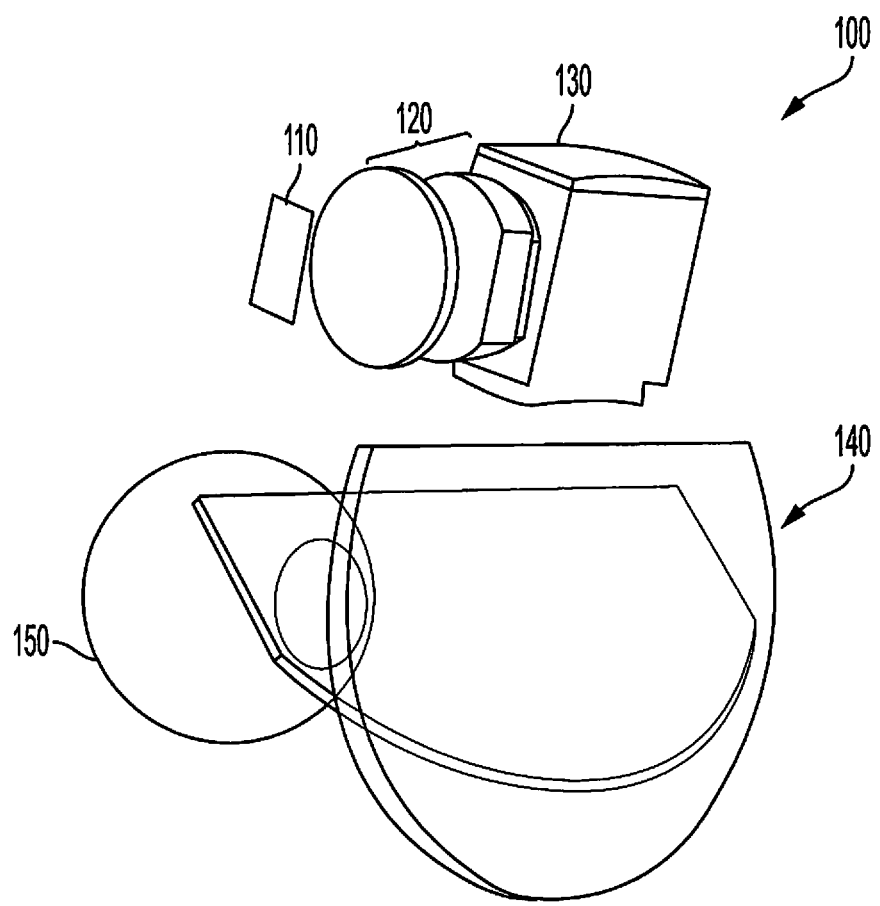
FIGS. 1A-1C show an optical structure comprising a catadioptric optical configuration in accordance with embodiments of the present invention.
Figure 1B:
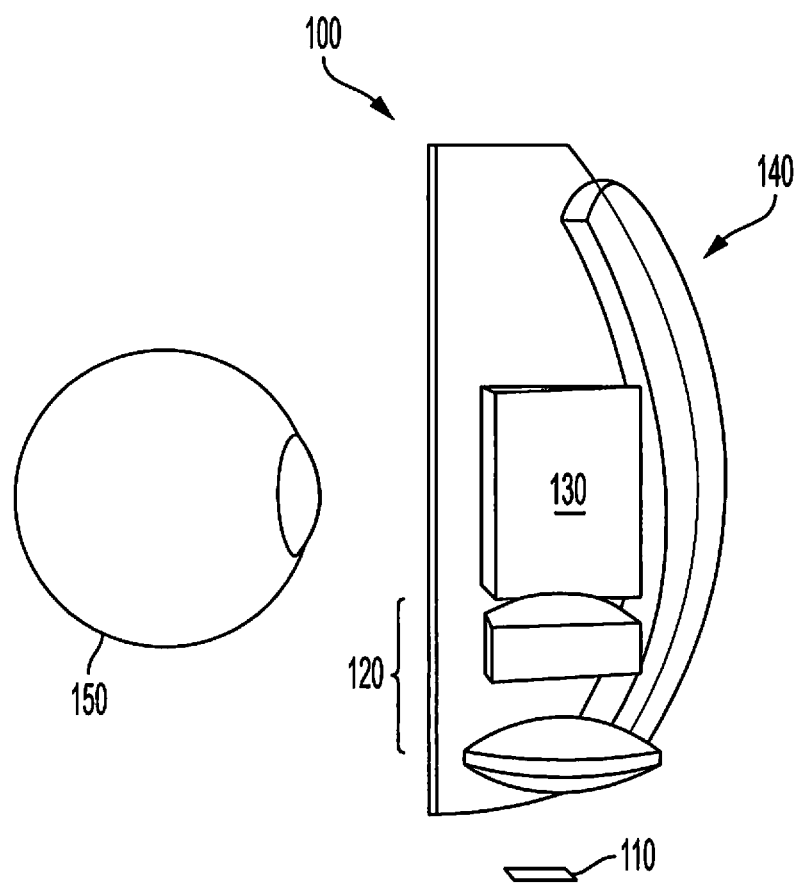
Figure 1C:
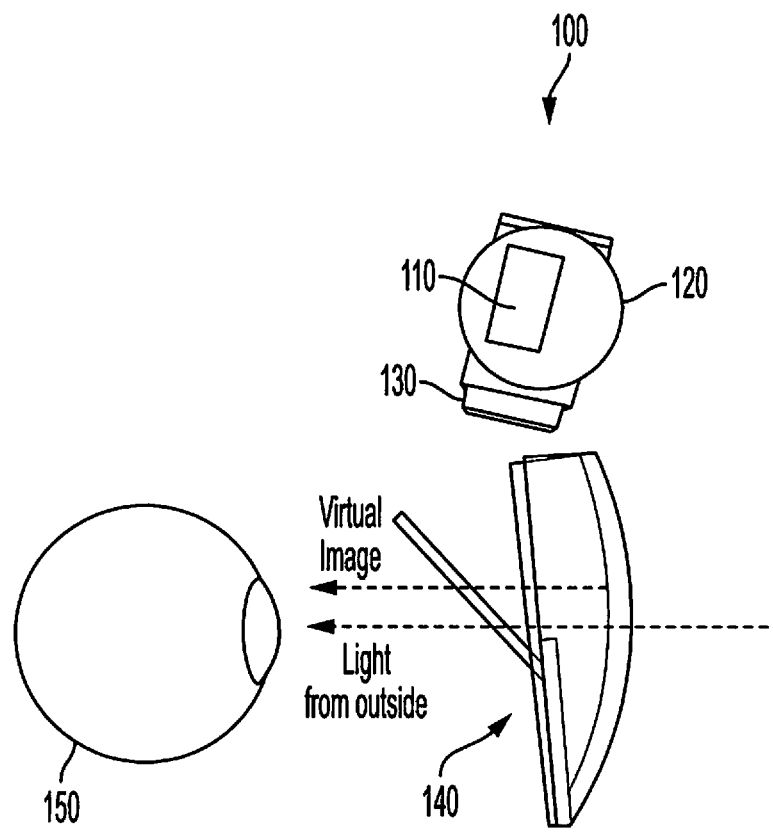

FIGS. 1A-1C show an optical structure comprising a catadioptric optical configuration in accordance with embodiments of the invention. In particular, FIG. 1A shows an isometric view of optical structure 100, while FIG. 1B shows a top view of optical structure 100 and FIG. 1C shows a side view of optical structure 100. Viewer's eye 150 is shown in FIGS. 1A-1C to illustrate the eye-box (i.e., the volume of space within which an effectively viewable image is formed) position with respect to optical structure 100.

Optical structure 100 of the illustrated embodiment comprise a catadioptric (hybrid refractive/reflective) optical configuration. Optical structure 100 comprises display 110 for supplying an image presented to the viewer as a virtual image through operation of the catadioptric optical configuration. Display 110 may, for example, display images generated from data provided by a processor-based system (not shown) connected thereto. Such processor-based systems may include general purpose processors (e.g., CORE processor available from Intel Corporation, RADEON processor available from Advanced Micro Devices, Inc., POWERPC processor available from International Business Machines, advanced reduced instruction set computer machine (ARM) central processing unit (CPU) core, and/or the like) and/or special purpose processors (e.g., application specific integrated circuit (ASIC), field programmable gate array (FPGA), graphics processing unit (GPU), and/or the like), operable under control of one or more code segments and/or other forms of logic circuits to provide image data to display 110. The processor-based systems may comprise one or more memories (e.g., random access memory (RAM), read only memory (ROM), flash memory, magnetic memory, optical memory, and/or the like) suitable for storing one or more instruction sets (e.g., application software, firmware, operating system, applets, and/or the like), data (e.g., configuration parameters, operating parameters, collected data, processed data, and/or the like), etc. utilized in accordance with concepts of the present invention.

Various optical components configured to provide refraction and reflection of light from display 110 to present the virtual image to the viewer are shown in FIGS. 1A-1C with respect to optical structure 100. The optical components shown in the illustrated embodiment comprise lens assembly 120, polarization convert prism assembly 130, and partially reflective curved combiner assembly 140. In operation of the optical components of optical structure 100 a magnified curved intermediate image is produced which is furthered magnified with proper reflection angle and transmitted to viewer's eye, as will be discussed in further detail below. Accordingly, embodiments of optical structure 100 comprising a catadioptric optical configuration may utilize a small sized image source (e.g., a display ≤0.70 inch diagonal, such as a micro-display ≤0.40 inch diagonal) to produce a large field of view (FOV) (i.e., FOV>50°, such as 60°~90°).

As can be seen in the side view illustrated in FIG. 1C, the catadioptric optical configuration of optical structure 100 of embodiments may pass light from outside of optical structure 100 to the viewer in combination with the aforementioned virtual image from display 110. Accordingly, embodiments of optical structure 100 comprising a catadioptric optical configuration may provide an optical see through (OST) implementation. Moreover, in example embodiments the see-through transmittance with respect to the outside light is relatively high (e.g., transmission >50%) through the optical structure passing light from outside of the optical structure by partial reflection instead of polarization reflection.

It can be appreciated from the foregoing that optical structure 100 of embodiments is well suited for use in various implementations of personal portable displays providing a large FOV. For example, head-mounted displays or helmet-mounted displays (collectively HMDs), such as may be used in heads-up-display (HUD), virtual reality (VR), augmented reality (AR), Internet of things (IoT) applications, etc., may be provided using optical structure 100 in accordance with concepts of the present invention. It should be appreciated that the aforementioned processor-based systems providing image data to display 110 of embodiments may be internal to a personal portable display implementation (e.g., integral to a HMD device), or external thereto (e.g., an external computing system).

Figure 2A:
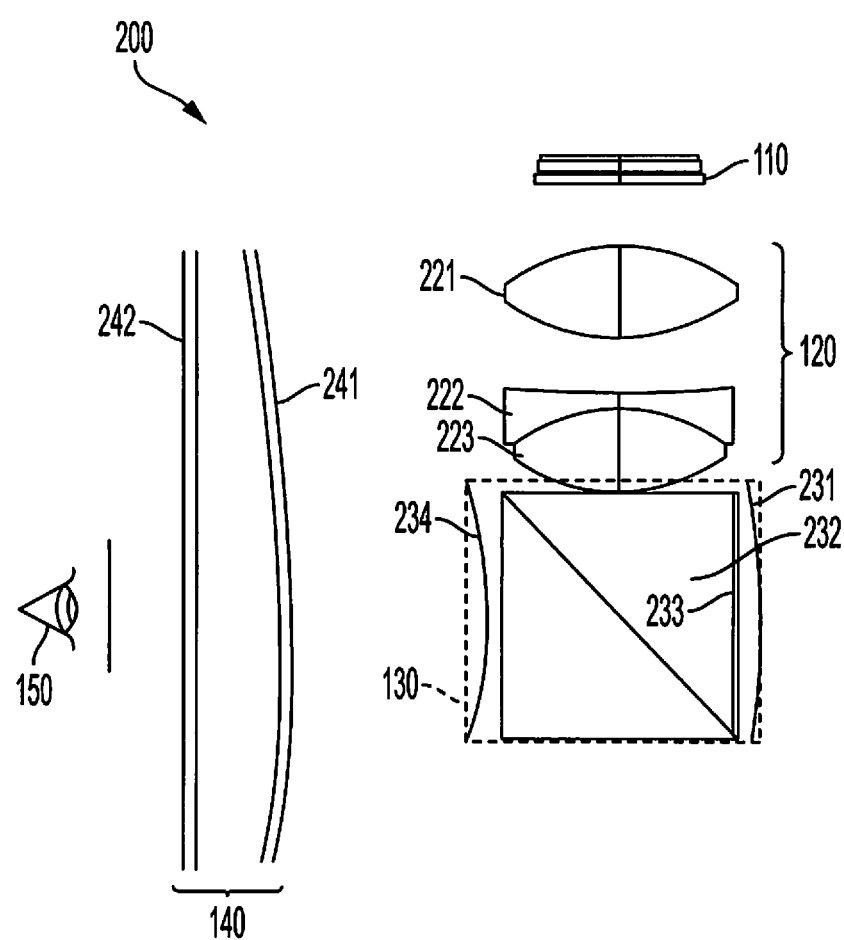
FIGS. 2A and 2B show detail with respect to an optical structure comprising a catadioptric optical configuration in accordance with embodiments of the present invention.
Figure 2B:
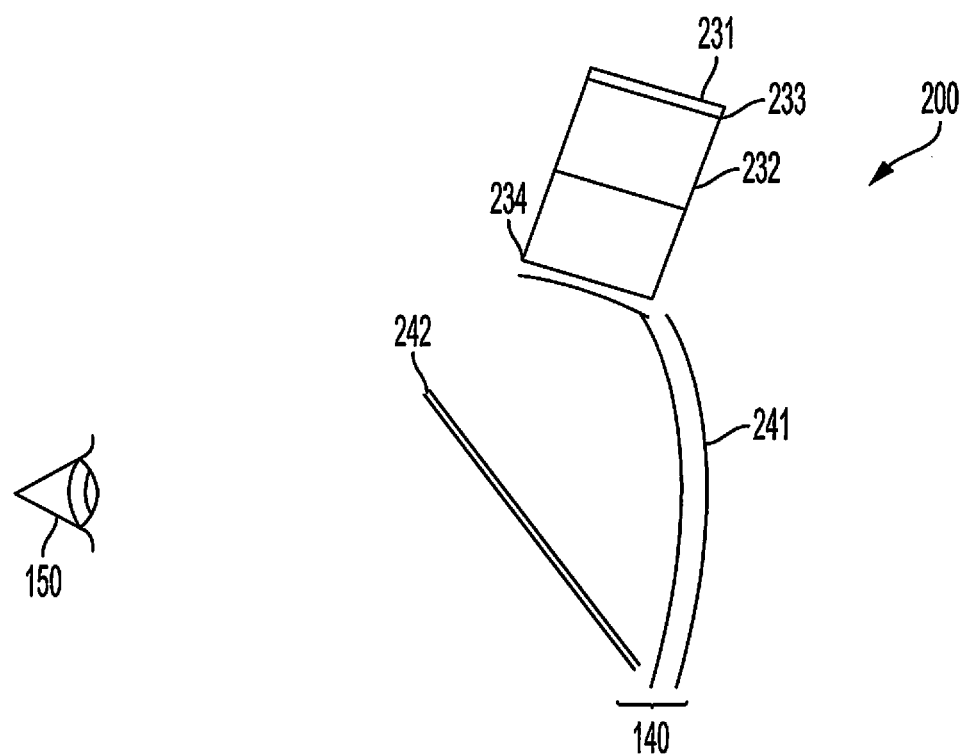

FIGS. 2A and 2B show further detail with respect to embodiments of a catadioptric optical configuration an optical structure in accordance with concepts of the present invention. In particular, FIG. 2A shows a top view of optical structure 200 and FIG. 2B shows a side view of optical structure 200. Optical structure 200 illustrated in FIGS. 2A and 2B implement a catadioptric optical configuration corresponding to that of the example shown in FIGS. 1A-1C, and thus comprise lens assembly 120, polarization convert prism assembly 130, and partially reflective curved combiner assembly 140 configured to provide refraction and reflection of light from display 110 to present the virtual image at an eye box thereof (e.g., represented by viewer's eye 150). It should be appreciated, however, that the deployment of various components of the optical structure as shown in FIGS. 2A and 2B are reversed or mirror imaged as compared to those of FIGS. 1A-1C (e.g., such as may be utilized to accommodate different orientations of the optical structure within a host device). Details with respect to exemplary embodiments of various optical components as may be utilized in providing the implementations shown in FIGS. 2A and 2B are described below.

Display 110 utilized with respect to embodiments of optical structures of the present invention may comprise any form of image source capable of providing images suitable for operation of catadioptric optical configurations in accordance with concepts herein. For example, display 110 may comprise a light emitting diode (LED) display, an organic light emitting diode (OLED) display, liquid crystal display (LCD), liquid crystal on silicon (LCoS) display, etc. It should be appreciated that some configurations of display 110 (e.g., LED display, OLED display, and backlit LCD display) emit light in their operation and thus may be used as an illumination source with respect to the optical structure. However, other configurations of display 110 (e.g., a LCoS display implementation) may not emit light in their operation and thus do not provide an illumination source with respect to the optical structure. Nevertheless, as will be better understood from the discussion which follows, either or both configurations of display 110 may be utilized according to embodiments of the invention. Irrespective of the particular display technology of display 110, display 110 of embodiments is preferably a small sized image source (e.g., a display ≤0.70 inch diagonal, such as a micro-display ≤0.40 inch diagonal) to facilitate a small overall size, such as for use with respect to personal portable displays, yet producing a large FOV through cooperative operation of the optical components of the optical structure.

Lens assembly 120 of embodiments of optical structure 200 provides for manipulation of light from display 110 prior to the light entering one or more other optical components of the optical structure. For example, lens assembly 120 may comprise a one or more lenses (e.g., as may be formed from an achromatic glass, plastic, or other optically transparent material), shown in the exemplary embodiment as including convex lens 221, concave lens 222, and convex lens 223 in the embodiment of FIGS. 2A and 2B, cooperatively operative provide light collimation and image magnification with respect to display 110. Lens assembly 120 of an embodiment may, for example, comprise a plastic aspheric lens for condensing and a cemented spherical glass lens for correcting color shift.

Polarization convert prism assembly 130 of embodiments of optical structure 200 provides for a magnified curved intermediate image, such as may provide a curved relay image plane for further magnified imaging by partially reflective curved combiner assembly 140 with optical aberration (distortion/field curve) corrected, being produced from light from display 110. Accordingly, polarization convert prism assembly 130 of the exemplary embodiment includes first curved mirror 231, polarization prism 232, quarter wave plate 233, and relay lens 234 operable in cooperation to produce the magnified curved intermediate image. In accordance with embodiments, polarization prism 232 (e.g., calcite crystal cut at a particular angle, such as 68°, with respect to the crystal axis, cut again diagonally, and rejoined as shown in FIG. 2A, such as using a layer of transparent adhesive) comprises a compact polarization prism providing a polarization beam splitter. First curved mirror 231 of embodiments provides a concave curved, fully reflective surface (e.g., as may be formed from glass, plastic, or other material suitable for an optical reflector, such as may provide a lens having spherical, aspheric optical surfaces or freeform optical surfaces with reflective coating) directed toward a face of polarization prism 232, wherein the curvature of the curved mirror is configured for image magnification with respect to display 110. According to embodiments of the invention, first curved mirror 231 is configured to condense the collimated image with further magnification, and to reflect the light towards partially reflective curved combiner assembly 140 by maintaining the light reflection and light path rotation together within polarization prism 232. Quarter wave plate 233 of embodiments, as may convert linearly polarized light into circularly polarized light and vice versa, may comprise a substantially light transmissive (e.g., transmission >90%) film (e.g., a polymer retarder film, with λ/4 achromatic retarder with greater than 90% transmission from 450-700 nm) disposed on a surface of polarization prism 232 between the polarization prism and first curved mirror 231. Relay lens 234 of embodiments comprises one or more lens (e.g., as may be formed from an achromatic glass, plastic, or other optically transparent material), shown as a concave shaping lens in the embodiment of FIGS. 2A and 2B, disposed to correspond to a surface of polarization prism 232 opposite the surface at which quarter wave plate 233 and first curved mirror 231 are disposed providing shaping with respect to the output of polarization prism 232.

In operation according to embodiments of polarization convert prism assembly 130, light from display 110 is provided to polarization convert prism assembly 130 through lens assembly 120 (e.g., collimated light of a magnified image of display 110 may be provided to polarization convert prism assembly 130 by lens assembly 120). Thereafter, light incident into polarization prism 232 is linearly polarized and refracted towards a quarter wave plate 233 by the interface of the different crystal planes therein. The light incident into quarter wave plate 233 is circularly polarized and passed to first curved mirror 231. The circularly polarized light incident to first curved mirror 231 is reflected back into polarization prism 232 through quarter wave plate 233. The circularly polarized light reflected by first circular mirror 231 passing through quarter wave plate 233 is secondly linearly polarized with a polarization phase shift of 90°. Accordingly, the linearly polarized light resulting from the reflected light from first curved mirror 231 passes through polarization prism 232 and is incident into relay lens 234, then transmitted through a relay lens. In accordance with embodiments of the present invention, the foregoing operation of polarization convert prism assembly 130 results in output of a magnified curved intermediate image (e.g., formed by lens group 120 and first curved mirror 231).

Partially reflective curved combiner assembly 140 of embodiments of optical structure 200 provides further magnification of the magnified curved intermediate image produced by polarization convert prism assembly 130. Accordingly, partially reflected curved combiner assembly 140 of the exemplary embodiment includes second curved mirror 241 and partially reflective plate 242 operable in cooperation to further magnify the magnified curved intermediate image. Partially reflective plate 242 of embodiments, as may redirect light of the magnified curved image to second curved mirror 241, may comprise a partially reflective (e.g., reflection ~30%, transmission ~70%) surface (e.g., as may be formed from an achromatic glass, plastic, or other optically transparent material) disposed at an angle with respect to the face of polarization prism 232 opposite that of the position of first curved mirror 231 and the concave face of second curved mirror 241. According to embodiments of the invention, partially reflective plate 242 is configured to reflect/rotate the light/intermediated image into second curved mirror 241, wherein the rotation provided makes the optical path become a top-down projection, and to keep the clearance in front of eye for the see-through area by a compact layout. In accordance with embodiments, second curved mirror 241 provides a concave curved, partially reflective (e.g., reflection ~20%, transmission ~80%) surface (e.g., as may be formed from an achromatic glass, plastic, or other optically transparent material, such as may provide a lens having spherical, aspheric optical surfaces or freeform optical surfaces with partially reflective coating) disposed in correspondence to a face of polarization prism 232 opposite that of the position of first curved mirror 231, wherein the curvature of the curved mirror is configured for image magnification with respect to the magnified curved intermediate image. According to embodiments of the invention, second curved mirror 241 is configured to reflect and magnify the curved intermediate image as provided thereto by partially reflective plate 242, whereby the reflected/collimated/magnified light passes through partially reflective plate 242 and forms a virtual collimated image towards the viewer's eye with large field of view and being optical aberration (distortion/field curve) corrected. Second curved mirror 241 of embodiments may thus provide further magnified imaging for the curved intermediate image and form an optical aberration corrected virtual collimated image with large field of view.

In operation according to embodiments of partially reflective curved combiner assembly 140, the magnified curved intermediate image output by polarization convert prism assembly 130 incident into partially reflective plate 242 is at least partially reflected by partially reflective plate 242 into second curved mirror 241. The magnified curved intermediate image incident to second curved mirror 231 is reflected back to, and at least partially through, partially reflective plate 242 further magnified by second curved mirror 241. This further magnified image is ultimately passed to an eye box (e.g., viewer's eye 150) of optical structure 200 of embodiments as an optical aberration corrected virtual collimated image.

Figure 3A:
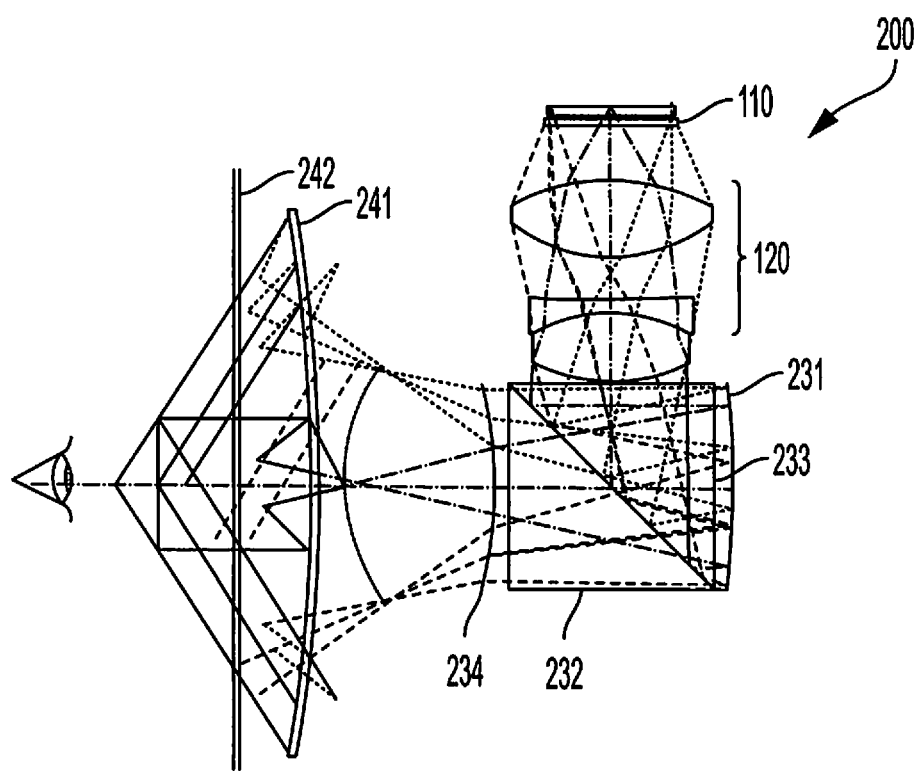
FIGS. 3A and 3B show ray traces graphically illustrating operation of a catadioptric optical configuration according to embodiments of the present invention.
Figure 3B:
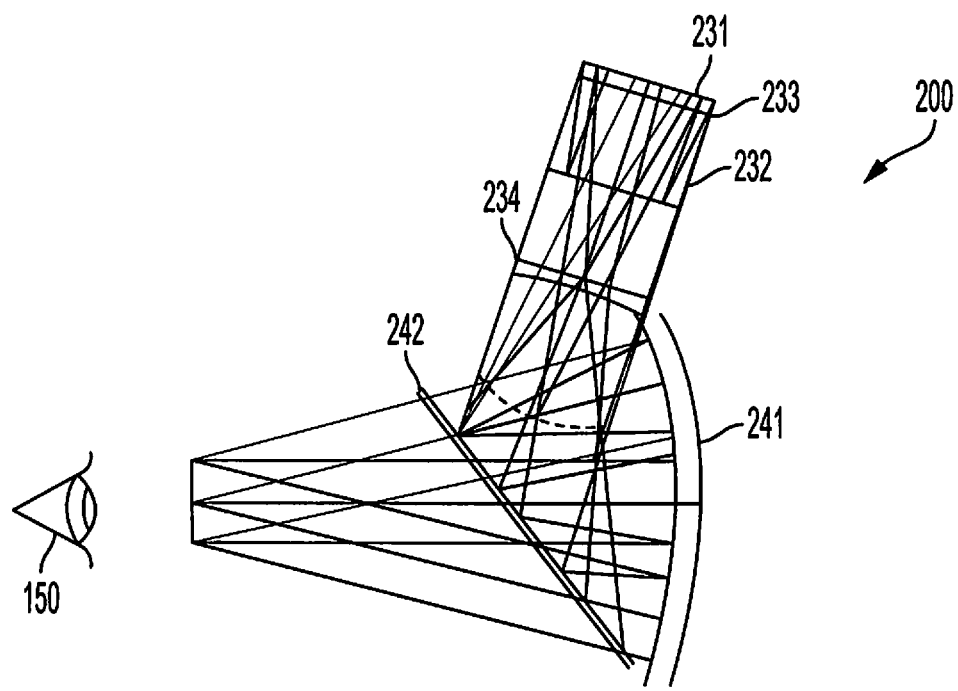

As can be appreciated from the foregoing, the catadioptric optical configuration of the illustrated embodiment of optical structure 200 comprises two curved mirrors (first curved mirror 231 and second curved mirror 241) utilized in producing a magnified curved intermediate image and further magnifying the magnified curved intermediate image with proper reflection angle. The ray traces shown in FIGS. 3A and 3B graphically illustrate the above described operation of the catadioptric optical configuration according to embodiments, wherein FIG. 3A shows a top view of optical structure 200 annotated with ray traces and FIG. 3B shows a side view of optical structure 200 annotated with ray traces. As may be seen in FIGS. 3A and 3B, light from display 110 is collimated and magnified through lens assembly 120. The light is incident into polarization prism 232, and reflected by first curved mirror 231 through polarization prism 232 to relay lens 234. The light is transmitted through relay lens 234 and a magnified curved intermediate image is thus formed by lens assembly 120 and first curved mirror 231. The magnified curved intermediate image is reflected by partially reflective plate 242 onto second curved mirror 241, and then reflected back through partially reflective plate 242 with proper reflection angle and transmitted to viewer's eye 150.

The magnified curved intermediate image is thus further magnified by second curved mirror 241 to thereby provide a virtual image providing a large FOV using a small image source. Accordingly, embodiments of optical structure 200 are well suited for personal portable display (e.g., HMD) implementations. Moreover, the partially reflective configuration of second curved mirror 241 and partially reflective plate 242, as well as the positioning of polarization convert prism 130, lens assembly 120, and display 110 out of the optical axis of viewer's eye 150, facilitates passing light from outside of optical structure 200 to viewer's eye 150 in combination with the aforementioned virtual image from display 110. Accordingly, embodiments of optical structure 200 provide an OST implementation, such as may be utilized in HUD, VR, and AR applications.

The catadioptric optical configuration of optical structures of embodiments of the invention provide advantages in addition to those described above. For example, as discussed below with reference to FIG. 4, optical structures comprising a catadioptric optical configuration according to embodiments facilitate illumination of the display using an external light source. In another example, as discussed below with reference to FIG. 5, optical structures comprising a catadioptric optical configuration according to embodiments facilitate eye sensing functionality in combination with presenting virtual images to a viewer.

Figure 4:
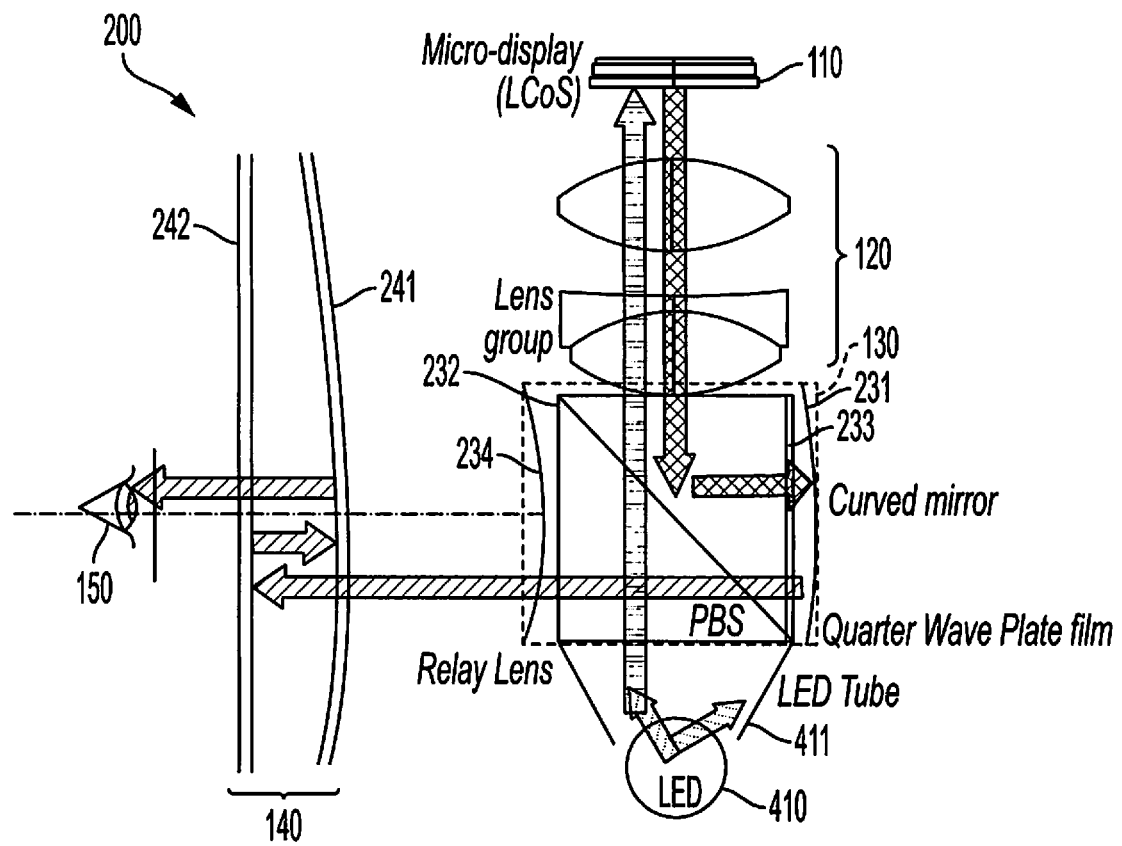
FIG. 4 shows an optical structure having a light source disposed on the optical axis shared by the display in accordance with embodiments of the present invention.

FIG. 4 shows an embodiment of optical structure 200 in which a light source (shown as LED light source 410) is disposed on the optical axis shared by display 110 to provide illumination thereto. For example, LED tube 411 may be used in combination with LED light source 410 to provide collimated illumination at a side of polarization prism 232 opposite display 110. Although a LED light source is shown in the example, other configurations of light sources may be used (e.g., laser light sources, electroluminescent light sources, etc.). Display 110 may comprise a LCoS panel or other image display device which needs external illumination (e.g., does not have an internal source of illumination). In operation according to embodiments, light from LED light source 410 passes through and is polarized by polarization prism 232, passes through lenses of lens assembly 120, and is incident on display 110. In accordance with some embodiments, a polarization plate or film may be disposed between LED light source 410 and polarization prism 232 to provide improved polarization purity with respect to the light. The light incident on display 110 illuminates the image displayed thereby and is returned to polarization prism 232 via lenses of lens assembly 120. The light returned from display 110, polarized by polarization prism 232, is reflected by polarization prism 232 and thus incident to quarter wave plate 233. The light passing through quarter wave plate 233 becomes circularly polarized light incident to first curved mirror 231. First curved mirror 231 reflects the light bake through quarter wave plate 233 and the light thus becomes second linearly polarized light with polarization phase shift of 90 degrees. The second linearly polarized light passes through polarization prism 232 and is transmitted through relay lens 234 and partially reflective curved combiner assembly 140 to an eye box of the optical structure, as represented by viewer's eye 150. Optical structures configured with a light source as shown above facilitate compact size implementations using a shared illumination and imaging path, such as when the image source is LCoS. As can be appreciated from the foregoing, such implementations are particularly well suited to provide illumination of otherwise unilluminated displays or otherwise under illuminated displays, while facilitating a compact form factor.

Figure 5:
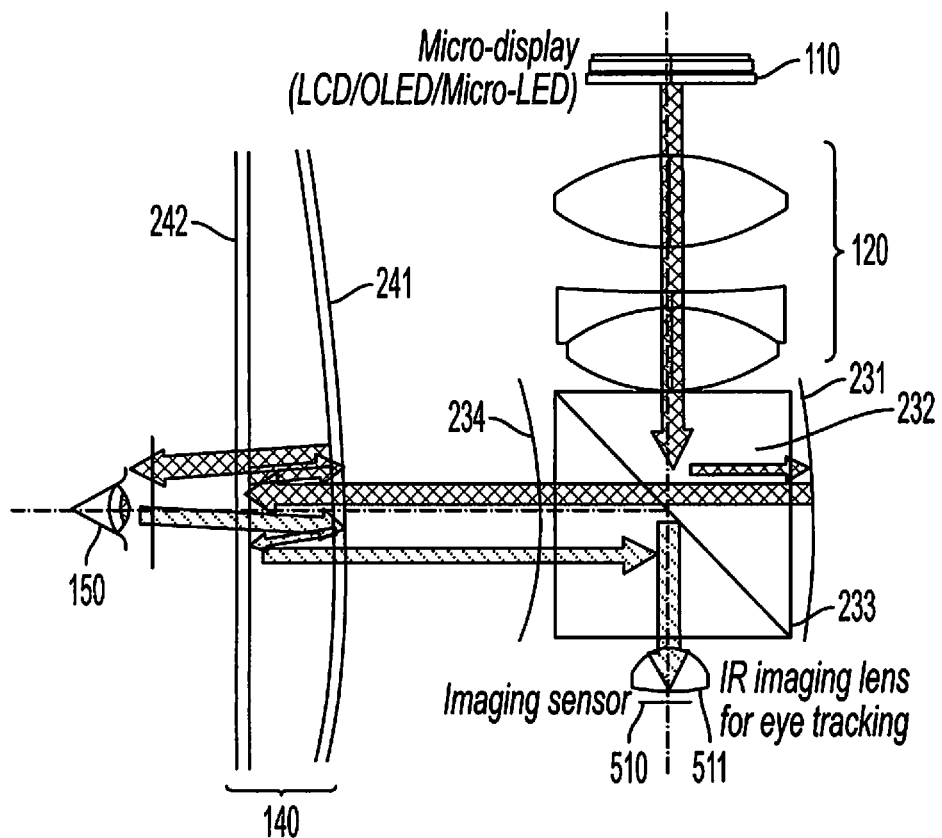
FIG. 5 shows an optical structure having an eye sensing apparatus disposed on the optical axis shared by the virtual image in accordance with embodiments of the present invention.

FIG. 5 shows an embodiment of optical structure 200 in which an eye sensing apparatus (shown as imaging sensor 510) is disposed on the optical axis shared by the virtual image, such as to provide eye tracking (e.g., eye movement detection, point of focus tracking, iris capturing, etc.). For example, imaging sensor 510 (e.g., infrared (IR) sensor) may be used in combination with imaging lens 511 (e.g., IR imaging lens for eye tracking) to monitor light from viewer's eye 150 for eye tracking determinations (e.g., using a processor-based system, such as that described above, coupled to imaging sensor 510). In operation according to embodiments, infrared light from viewer's eye 150 is transmitted through partially reflective curved combiner assembly 140 and relay lens 234, and is thus incident to polarization prism 232. The infrared light incident to polarization prism 232 is polarized and thus reflected by polarization prism 232, becoming incident to imaging lens 511. The infrared light incident to imaging lens 511 is passed therethrough to imaging sensor 510. Optical structures configured with an imaging sensor as shown above facilitate distortion free eye and/or iris capture due to on axis imaging, as well as simplified calibration for virtual display user interface with eye tracking due to same optical axis for virtual display and eye gaze sensing image. As can be appreciated from the foregoing, such implementations are particularly well suited to enable advanced features associated with eye tracking, while facilitating a compact form factor.

Exemplary design specifications are provided below for an implementation of an optical structure comprising a catadioptric optical configuration in accordance with concepts of the present invention. The exemplary design specifications are provided to aid in understanding an implementation of an optical structure consistent with that of optical structures 100 and 200 discussed above. It should be understood, however, that the particulars of the example implementation are not limiting with respect to implementation of embodiments in accordance with the concepts of the present invention. The design specification shown in the table below is for an exemplary embodiment of an optical structure, comprising a catadioptric optical configuration, providing a 60° field of view:

| FOV60 Example | |
|---|---|
| Microdisplay | 0.39" LCoS |
| Resolution | 1920*1080 |
| Field of View | 52H*29V degree; diagonal 60 degree |
| Eyebox (mm) | Ø10*7 |
| Focal length (mm) | 9 |
| Eye relief | 20 mm |
| Light source | RGB LED |
| Distortion | <1% |
| Modulation Transfer Function (MTF) | >0.3@110 lp/mm |
| System F-number | 1.08 |

It should be appreciated that, although example embodiments of optical structures have been described herein with reference to a single display and corresponding optical components, embodiments of the invention may comprise multiple instances of some or all such components. For example, multiple instances of display 110 and optical structure 200 (e.g., as may be reversed or mirror imaged with respect to each other, as shown in FIGS. 1A-1C as compared to FIGS. 2A and 2B) may be included in a HMD to provide separate virtual images to each of the viewer's eyes (e.g., the orientation of optical structure 100 may be utilized with respect to a viewer's right eye while the orientation of optical structure 200 may be utilized with respect to a viewer's left eye).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A optical structure for providing a large field of view (FOV) virtual image, the optical structure comprising:
   a polarization convert prism assembly configured to produce a magnified curved intermediate image from light from a display, wherein the polarization convert prism assembly comprises a polarization prism, a quarter wave plate, and a first curved mirror; and
   a partially reflective curved combiner assembly configured to further magnify the magnified curved intermediate image and produce the large FOV virtual image.

2. The optical structure of claim 1, wherein the polarization convert prism assembly and the partially reflective curved combiner assembly together provide a catadioptric optical configuration of the optical structure.

3. The optical structure of claim 1, further comprising:
   a lens assembly disposed in an optical path between the display and the polarization convert prism assembly, wherein the lens assembly is configured to collimate light and magnify images of the display provided to the polarization convert prism assembly.

4. The optical structure of claim 1, wherein the quarter wave plate is disposed between a surface of the polarization prism and a face of the first curved mirror, wherein the polarization prism is oriented to reflect polarized light toward the quarter wave plate, and wherein a reflective surface of the first curved mirror is oriented to reflect light toward the quarter wave plate.

5. The optical structure of claim 1, wherein the polarization convert prism assembly further comprises:
   a relay lens disposed between the polarization prism and the partially reflective curved combiner assembly.

6. The optical structure of claim 1, wherein the partially reflective curved combiner assembly comprises:
   a second curved mirror; and
   a partially reflective plate.

7. The optical structure of claim 6, wherein the second curved mirror is larger than the first curved mirror.

8. The optical structure of claim 6, wherein the second curved mirror and the partially reflective plate are both partially reflective with respect to the light from the display.

9. The optical structure of claim 8, wherein the partially reflective curved combiner assembly is oriented to pass light from outside of the optical structure to a viewer in combination with the large FOV virtual image as a see-through display.

10. The optical structure of claim 1, further comprising:
    a light source disposed on an opposite side of the polarization convert prism assembly from the display and configured to illuminate the display through the polarization convert prism assembly.

11. The optical structure of claim 1, further comprising:
    an imaging sensor disposed on an opposite side of the polarization convert prism assembly from the display and configured to track an eye of a viewer.

12. The optical structure of claim 1, wherein the large FOV virtual image provides a FOV greater than 50°.

13. The optical structure of claim 12, wherein the display is a small display having an image area of less than or equal to 0.70 inch measured diagonally.

14. The optical structure of claim 12, wherein the display is a micro-display having an image area of less than or equal to 0.40 inch measured diagonally.

15. The optical structure of claim 1, further comprising:
    a personal portable display apparatus housing the polarization convert prism assembly and the partially reflective curved combiner assembly.

16. The optical structure of claim 15, wherein the personal portable display apparatus comprises a head-mounted display or a helmet-mounted display.

17. A method for providing a large field of view (FOV) virtual image, the method comprising:
    producing, using a polarization convert prism assembly of an optical structure, a magnified curved intermediate image from light from a display incident upon the polarization convert prism assembly, wherein the polarization convert prism assembly comprises a polarization prism, a quarter wave plate, and a first curved mirror, wherein the quarter wave plate is disposed between a surface of the polarization prism and a face of the first curved mirror, wherein the polarization prism is oriented to reflect polarized light toward the quarter wave plate, and wherein a reflective surface of the first curved mirror is oriented to reflect light toward the quarter wave plate; and
    magnifying, using a partially reflective curved combiner assembly of the optical structure, the magnified curved intermediate image to thereby produce the large FOV virtual image.

18. The method of claim 17, further comprising:
    magnifying, using a lens assembly of the optical structure disposed in an optical path between the display and the polarization convert prism assembly, an image provided by the display, wherein the magnifying the image provided by the display using the lens assembly magnifies the image prior to producing the magnified curved intermediate image using the polarization convert prism.

19. The method of claim 17, wherein the polarization convert prism assembly further comprises a relay lens disposed between the polarization prism and the partially reflective curved combiner assembly.

20. The method of claim 17, wherein the partially reflective curved combiner assembly comprises a second curved mirror and a partially reflective plate, wherein the second curved mirror is larger than the first curved mirror, and wherein the second curved mirror and the partially reflective plate are both partially reflective with respect to the light from the display.

21. The method of claim 20, wherein the partially reflective curved combiner assembly is oriented to pass light from outside of the optical structure to a viewer in combination with the large FOV virtual image as a see-through display.

22. The method of claim 17, further comprising:
    illuminating the display using a light source disposed on an opposite side of the polarization convert prism assembly from the display.

23. The method of claim 17, further comprising:
tracking an eye of a viewer using an imaging sensor disposed on an opposite side of the polarization convert prism assembly from the display.

24. An optical system of a large field of view (FOV) head-mounted display (HIVID), the optical system comprising:
a display;
a lens assembly disposed in correspondence to an image source of the display and configured to magnify and collimate light from the display;
a polarization convert prism assembly having a first surface disposed in correspondence to the lens assembly and configured to receive the light from the display as magnified and collimated by the lens assembly and produce a magnified curved intermediate image therefrom by polarization, refraction, and reflection;
a partially reflective plate disposed in correspondence to the polarization convert prism assembly and configured to receive and partially reflect the magnified curved intermediate image; and
a second curved mirror disposed in correspondence to the partially reflective plate and configured to receive the magnified curved intermediate image as reflected by the partially reflective plate and produce a virtual image therefrom by magnification and partial reflection.

25. The optical system of claim 24, wherein the polarization convert prism assembly comprises:
a polarization prism having a first surface disposed to the lens assembly and configured to receive, firstly linearly polarize, and reflect light from the display as magnified and collimated by the lens assembly;
a quarter wave plate disposed in correspondence with a second surface of the polarization prism and configured to receive and circularly polarize the light from the display as firstly linearly polarized and reflected by the polarization prism;
a first curved mirror disposed in correspondence with the second surface of the polarization prism and configured to reflect and magnify the light from the display as circularly polarized by the quarter wave plate, wherein the light from the display magnified and reflected by the first curved mirror is incident on the quarter wave plate and is secondly linearly polarized by the quarter wave plate with a polarization phase shift of 90° with respect to the light from the display firstly linearly polarized by the polarization prism; and
a relay lens disposed in correspondence to a third surface of the polarization prism and configured to receive and shape the light from the display as secondly linearly polarized by the quarter wave plate and passed by the polarization prism, wherein the magnified curved intermediate image is produced by the polarization prism, quarter wave plate, first curved mirror and relay lens from the light from the display.

26. The optical system of claim 25, wherein the partially reflective plate is configured to receive and partially reflect the light from the display as shaped by the relay lens, wherein the second curved mirror is configured to receive the light from the display as partially reflected by the partially reflective plate and partially reflect and magnify the light from the display as partially reflected by the partially reflective plate, and wherein the virtual image is produced by the partially reflective plate and the second curved mirror from the magnified curved intermediate image.

27. The optical system of claim 24, further comprising:
a light source disposed on an opposite side of the polarization convert prism assembly from the display and configured to illuminate the display through the polarization convert prism assembly.

28. The optical system of claim 24, further comprising:
an imaging sensor disposed on an opposite side of the polarization convert prism assembly from the display and configured to track an eye of a viewer.

29. The optical system of claim 24, wherein the virtual image is a large FOV virtual image providing a FOV greater than 50°.

30. A optical structure for providing a large field of view (FOV) virtual image, the optical structure comprising:
a polarization convert prism assembly configured to produce a magnified curved intermediate image from light from a display;
a light source disposed on an opposite side of the polarization convert prism assembly from the display and configured to illuminate the display through the polarization convert prism assembly; and
a partially reflective curved combiner assembly configured to further magnify the magnified curved intermediate image and produce the large FOV virtual image.

31. A method for providing a large field of view (FOV) virtual image, the method comprising:
producing, using a polarization convert prism assembly of an optical structure, a magnified curved intermediate image from light from a display incident upon the polarization convert prism assembly;
illuminating the display using a light source disposed on an opposite side of the polarization convert prism assembly from the display; and
magnifying, using a partially reflective curved combiner assembly of the optical structure, the magnified curved intermediate image to thereby produce the large FOV virtual image.

* * * * *

UNITED STATES PATENT AND TRADEMARK OFFICE
CERTIFICATE OF CORRECTION

PATENT NO. : 11,435,584 B2
APPLICATION NO. : 16/352127
DATED : September 6, 2022
INVENTOR(S) : Dehua Liu et al.

Page 1 of 1

It is certified that error appears in the above-identified patent and that said Letters Patent is hereby corrected as shown below:

In the Specification

At Column 1, Line number 55, delete "(FOV<50°" and replace with --(FOV<50°)--.
At Column 1, Line number 61, delete "(FOV<40°" and replace with --(FOV<40°)--.

In the Claims

At Column 13, Claim number 24, Line number 6, delete "(HIVID)" and replace with --(HMD)--.

Signed and Sealed this
Twenty-fifth Day of October, 2022

Katherine Kelly Vidal
*Director of the United States Patent and Trademark Office*